(12) United States Patent
Tanner et al.

(10) Patent No.: US 12,113,228 B2
(45) Date of Patent: Oct. 8, 2024

(54) TRANSPORTABLE STRUCTURE FOR SECURING ENERGY STORAGE DEVICE RACKS

(71) Applicant: Caterpillar Inc., Peoria, IL (US)

(72) Inventors: John M. Tanner, Dunlap, IL (US); Craig P. Hittle, Dunlap, IL (US); Christopher David Derham, Chillicothe, IL (US); Bradley R. Sparks, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 617 days.

(21) Appl. No.: 17/168,751

(22) Filed: Feb. 5, 2021

(65) Prior Publication Data

US 2022/0255173 A1 Aug. 11, 2022

(51) Int. Cl.
*H01M 50/244* (2021.01)
*H01M 50/209* (2021.01)

(52) U.S. Cl.
CPC ....... *H01M 50/244* (2021.01); *H01M 50/209* (2021.01)

(58) Field of Classification Search
None
See application file for complete search history.

(56) References Cited

U.S. PATENT DOCUMENTS

| 6,586,132 | B1 * | 7/2003 | Fukuda | ............ | H01M 50/209 |
| | | | | | 429/176 |
| 7,740,142 | B2 * | 6/2010 | Miller | ............ | H01M 50/296 |
| | | | | | 211/26 |
| 9,560,921 | B2 | 2/2017 | Resch | | |
| 9,930,974 | B2 | 4/2018 | Resch | | |
| 10,230,139 | B2 | 3/2019 | Lee et al. | | |
| 10,555,440 | B2 * | 2/2020 | Bailey | ............ | H05K 7/20727 |
| 2014/0229398 | A1 * | 8/2014 | Conrardy | ............ | G06Q 30/00 |
| | | | | | 705/330 |
| 2020/0266496 | A1 * | 8/2020 | Podolefsky | ............ | H01M 50/204 |
| 2020/0371165 | A1 * | 11/2020 | Schweitzer | ............ | G01N 29/346 |

FOREIGN PATENT DOCUMENTS

| CN | 204348860 | 5/2015 |
| CN | 6121856 | 4/2017 |
| CN | 210298256 | 4/2020 |

* cited by examiner

*Primary Examiner* — Matthew T Martin
*Assistant Examiner* — Krishna R Hammond
(74) *Attorney, Agent, or Firm* — Lee & Hayes, PLLC

(57) ABSTRACT

A housing includes a plurality of subassemblies. At least one subassembly of the plurality of subassemblies includes a lower structure extending in a first direction and configured to support one or more batteries, an upper structure extending in the first direction and spaced apart from the lower structure by a vertical distance, and one or more vertical posts attached to the lower structure, the one or more vertical posts connecting the lower structure with the upper structure. The housing further includes a plurality of intermediate panels located between the one or more vertical posts, the plurality of intermediate panels extending in a vertical direction between the lower structure and the upper structure, wherein a battery of the one or more batteries is attached to the lower structure and at least two intermediate panels of the plurality of intermediate panels. The housing also includes a lateral brace attached to and connecting the multiple subassemblies.

15 Claims, 6 Drawing Sheets

TRANSPORTABLE STRUCTURE FOR SECURING ENERGY STORAGE DEVICE RACKS

TECHNICAL FIELD

The present disclosure relates to a transportable structure for securing energy storage device racks. More specifically, the present disclosure relates to a structure that stores battery racks that are designed for stationary applications, and secures the battery racks during transport.

BACKGROUND

Energy storage device racks (which may include "battery racks") are used in a variety of applications in order to provide batteries that provide and/or store energy. For example, in some applications, the batteries included in the battery racks receive and store electricity generated by wind turbines, photovoltaic modules, or other energy generating devices. Furthermore, in some applications, the batteries of the battery racks can supply energy as an alternative energy source and/or supplement electricity that is provided via a grid system, generator set, or other system.

Typically, when batteries are installed in the battery racks, the battery racks are heavy and are not easily transportable. In addition, such battery racks often lack the necessary structural strength to handle vibration or other forces experienced during transportation. As such, transporting known battery racks can damage the battery racks themselves, damage the individual batteries stored within the battery racks, and/or can create potential safety issues if the stored batteries become dislodged during transportation. Furthermore, the batteries stored within the such battery racks must be adequately cooled when used to ensure that the batteries do not overheat. However, providing a cooling system that is configured to adequately cool the batteries stored within multiple battery racks during use can be challenging due to the configurations of the battery racks themselves. Moreover, if it is necessary to transport such batter racks between various locations, such cooling systems are not generally configured to remain operably connected to the battery racks during transportation. Instead, such cooling systems are reconnected and/or reconfigured once the battery racks are installed at their new location. Such a process is cumbersome and time-consuming, and adds to the difficulties associated with transporting known battery racks.

An example energy storage device superstructure is described in Japanese Patent Pub. No. JP6121856 (hereinafter referred to as "the '856 reference"). In particular, the '856 reference describes a housing for multiple batteries that includes air ducts to provide adequate cooling to the batteries stored in the housing. For example, the '856 reference describes a housing (such as an intermodal container or "shipping container") having racks that include a plurality of vertical shelves to store a plurality of batteries. The '856 reference also describes a series of ducts that are located on a top surface of the housing between the racks. The series of ducts provide conditioned air to the housing to ensure the batteries stored therein do not overheat. However, the housing described in the '856 reference requires individual batteries to be installed on the shelving itself, and not on a structure of the housing that is isolated from vibration or other stresses associated with transporting relatively heavy loads. Furthermore, as the ducting described in the '856 reference provides air in a top-down manner, the particular configuration of the ducting does not provide uniform cooling of each battery stored within the housing. Thus, the '856 reference does not describe a structure (or superstructure) that is capable of securing multiple individual battery racks during transportation, each having a plurality of individual battery secured therein. Nor does the '856 reference describe a system that is configured to provide uniform cooling for each battery disposed within the multiple battery racks during use.

Example embodiments of the present disclosure are directed toward overcoming the deficiencies described above.

SUMMARY

An example housing includes a first assembly, a second assembly, and a pair of lateral braces securing the first subassembly to the second subassembly. The first assembly includes a first lower structure defining a bottom portion of the first subassembly, a first pair of crossmembers defining a top portion of the first subassembly, a first pair of vertical posts attached to the first lower structure and the first pair of crossmembers at a first end of the first subassembly, and a second pair of vertical posts attached to the first lower structure and the first pair of crossmembers at a second end of the first subassembly. The first assembly further includes a first plurality of intermediate panels extending in a vertical direction between the first lower structure and the first pair of upper crossmembers, and located between the first pair of vertical posts and the second pair of vertical posts, wherein individual intermediate panels of the first plurality of intermediate panels are spaced apart at a first distance. The second assembly includes a second lower structure defining a bottom portion of the second subassembly, a second pair of crossmembers defining a top portion of the second subassembly, a third pair of vertical posts attached to the second lower structure and the second pair of crossmembers at a first end of the second subassembly, and a fourth pair of vertical posts attached to the second lower structure and the second pair of crossmembers at a second end of the second subassembly. The second subassembly further includes a second plurality of intermediate panels extending in a vertical direction from the second lower structure to the second pair of crossmembers, and located between the third pair of vertical posts and the fourth pair of vertical posts, wherein individual intermediate panels of the second plurality of intermediate panels are spaced apart at a second distance.

An example housing includes a plurality of subassemblies. At least one subassembly of the plurality of subassemblies includes a lower structure extending in a first direction and configured to support one or more batteries, an upper structure extending in the first direction and spaced apart from the lower structure by a vertical distance, and one or more vertical posts attached to the lower structure, the one or more vertical posts connecting the lower structure with the upper structure. The housing further includes a plurality of intermediate panels located between the one or more vertical posts, the plurality of intermediate panels extending in a vertical direction between the lower structure and the upper structure, wherein a battery of the one or more batteries is attached to the lower structure and at least two intermediate panels of the plurality of intermediate panels. The housing also includes a lateral brace attached to and connecting the multiple subassemblies.

In a further example, a method of storing a plurality of batteries includes providing a plurality of subassemblies, wherein at least one subassembly of the plurality of subassemblies includes a lower structure and a pair of upper crossmembers, securing vertical posts to the lower structure and the pair of upper crossmembers, and securing intermediate panels to the first lower structure and the first pair of upper cross members such that the intermediate panels are located between first vertical posts and span a distance between the lower structure and the pair of upper crossmembers. The method further includes inserting at least one battery rack between the intermediate panels and the distance, the battery rack including a plurality of batteries. The method also includes providing a pair of lateral braces and securing the pair of lateral braces to the at least one subassembly and another subassembly of the plurality of subassemblies, thereby securing the at least one subassembly to the other subassembly.

DETAILED DESCRIPTION

This disclosure generally relates to a superstructure that secures energy storage device racks therein during use and during transportation. For the purpose of the present disclosure, individual energy storage device racks are referred to herein as a "battery rack". When used herein, a "battery rack" may refer to a structure on which individual energy storage devices (such as batteries) are installed. Wherever possible, the same reference numbers will be used throughout the drawings to refer to the same or like parts.

Figure 1:
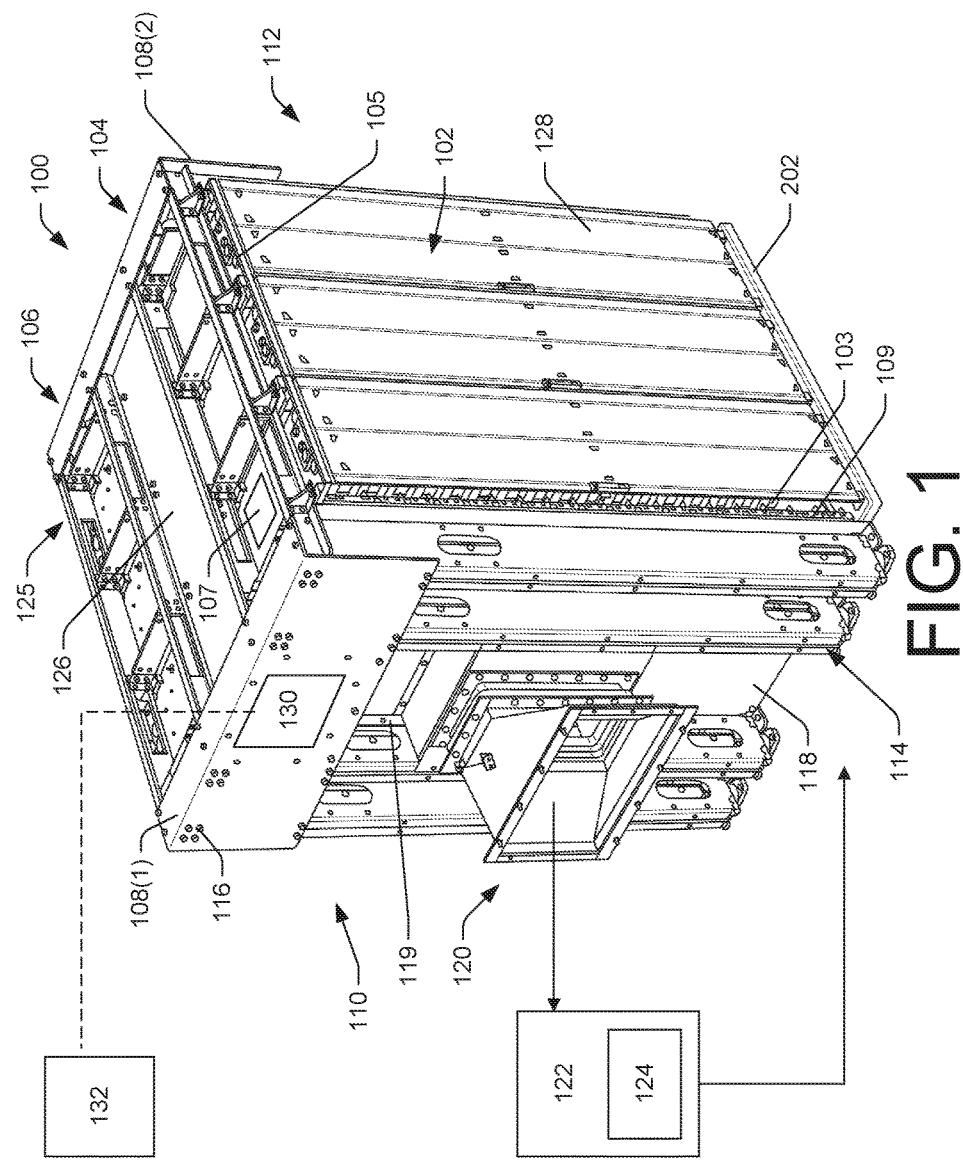
FIG. 1 is a perspective view of an example transportable structure for storing battery racks in accordance with an example of the present disclosure.

FIG. 1 depicts a first perspective view of an example transportable housing 100. As will be described below, the housing 100 is configured to store one or more battery racks 102 therein. FIG. 1 depicts the housing 100 having the battery racks 102 therein. The battery racks 102 are modular storage structures, and each battery rack 102 is configured to secure a plurality of individual energy storage devices (such as batteries) therein. The housing 100, and components thereof, may be made from various types of metals and/or alloys including, but not limited to, steel, aluminium, titanium, or other suitable materials. As shown in FIG. 1, the housing 100 is configured to secure multiple battery racks 102 therein.

While FIG. 1 depicts six battery racks 102 secured in the housing 100, the housing 100 may be configured to secure fewer than or more than six battery racks 102 therein. By way of example, and not limitation, the housing 100 may be configured to secure as few as two battery racks 102 therein and up to ten battery racks 102. However, the housing 100 may be configured to secure any number of battery racks 102 therein. For example, while the housing 100 shown in FIG. 1 has a capacity of six battery racks 102, if more than six battery racks 102 are to be secured in the housing 100, the housing 100 is scalable to accommodate additional battery racks 102. In some examples, the number of battery racks 102 included in the housing 100 may be determined based on specific power and energy requirements of the application for which the housing 100 and battery racks 102 are to be used.

In some examples, the housing 100 includes one or more subassemblies. For instance, as shown in FIG. 1, an example housing 100 includes a first subassembly 104 and a second subassembly 106 (collectively referred to herein as "the subassemblies 104 and 106"). The subassemblies 104 and 106 may be identical and may, therefore, include the same components. The components of the subassemblies 104 and 106 will be described further herein with respect to FIG. 4. As shown in FIG. 1, the subassemblies 104 and 106 are configured to secure one or more battery racks 102 to components of the housing 100. In some examples, the housing 100 may include a number of battery racks 102 secured therein that is less than a number of positions available to secure the battery racks 102. For example, the housing 100 shown in FIG. 1 includes six positions for securing the battery racks 102 therein. However, in some examples, the housing 100 may include five (or less) battery racks 102 secured therein. It is to be noted that the number of battery racks 102 described as being stored within each of the subassemblies 104 and 106 merely provide an example scenario and should not be construed as limiting. However, if the number of battery racks 102 stored within the housing 100 is less than the total number of available positions for securing the battery racks 102 within the housing 100, the battery racks 102 may be positioned at locations within the housing 100 to substantially distribute the weight across the housing 100.

As mentioned previously, the battery racks 102 include batteries secured therein. In some examples, the batteries may be lithium ion batteries. For example, the batteries may be lithium cobalt oxide, lithium manganese oxide, lithium nickel manganese cobalt oxide, lithium iron phosphate, lithium nickel cobalt aluminum oxide, lithium titanate, or other type of batteries. Furthermore, the batteries may be packaged into battery modules 103 that are secured in the battery racks 102. For example, a battery module 103 may be a housing that stores a number of individual battery cells. The battery module 103 may provide structural support for the battery cells, cooling structure to provide airflow for the battery cells, connectivity between the battery cells, communication between battery cells and/or a controller, etc. In some examples, the battery cells may be spaced apart within the battery module 103 to allow air to flow between individual battery cells. The type, size, capacity, or other parameter of the battery cells may be selected based on specific power and energy requirements of the application for which the batteries are to be used.

Furthermore, an individual battery rack of the battery racks 102 may include a number of battery modules 103 having individual battery cells therein. For example, a single battery rack may include between 10 and 20 battery modules 103 installed therein. However, the number of battery modules 103 secured in a battery rack 102 may vary based on application, output requirements, etc. The battery racks 102 may also include one or more communication and/or electrical interfaces 105. The interfaces 105 may provide wired and/or wireless interfaces between the battery racks 102 and/or between the battery racks and a bank manager (described further herein).

The battery racks 102 may also include a battery management system (BMS) 107 that may include a battery protection unit and/or other components. In some examples, each battery rack 102 may include a designated BMS 107. However, in some examples, a single BMS 107 may manage each battery rack 102 and batteries included therein. The BMS 107 may monitor a state of the batteries and may ensure safe operation thereof. The BMS 107 may include one or more switches that connect/disconnect the batteries to and from a charger. The BMS 107 may be configured to prevent overcharge, thereby preventing batteries from being charged over their respective maximum capacities. The BMS 107 may also control operation of one or more fans that may be included in each battery module 103 in order to ensure that the batteries operate within predetermined temperature ranges. The BMS 107 controls these and other operations and/or parameters of the batteries included in the battery racks 102.

Furthermore, and as mentioned previously, the battery racks 102 may include a support structure 109 to which the battery modules 103 may be secured. For example, the support structure 109 may include posts that provide vertical support for the battery modules 103. The posts may include extending from the posts to which the battery modules may rest and may be secured thereto via fasteners. The support structure 109 may also include a top panel and a bottom panel. The top panel and the bottom panel may be fastened to the posts of the support structure 109 and may provide lateral support for the battery racks 102 and the batteries secured therein. In some examples, the battery racks 102 and batteries secured therein may be implemented to supplement power supplied by generator sets for oil and natural gas drilling and/or fracking, among other potential industry applications. As such, the battery racks 102 and batteries may be transported across rough and/or rural roads (or across waterways) and the support structures 109 of the battery racks 102 may be inadequate to safely secure the batteries by themselves and may require additional structure such as the housing 100. The housing 100 may be capable of securing the battery racks 102 such that the housing 100 and the battery racks 102 are transportable under substantially rough transportation conditions.

As shown in FIG. 1, the housing 100 further includes one or more lateral braces 108 attached to the first subassembly 104 and the second subassembly 106, thereby securing the first subassembly 104 to the second subassembly 106. For example, the housing 100 may include a first lateral brace 108(1) located on a first end 110 of the housing 100 and a second lateral brace 108(2) located on a second end 112 of the housing 100 opposite the first end 110. As shown in FIG. 1, the lateral braces 108 may be located proximate a top portion of the housing 100. The lateral braces 108 may be secured to the subassemblies 104 and 106, thereby connecting the subassemblies 104 and 106 and providing lateral stability to the housing 100. In other words, when the housing 100 experiences lateral forces, the lateral braces 108 transfer such forces across the housing 100 and the housing 100 is able to withstand such forces rather than the individual subassemblies 104 and 106 having to undergo such forces individually. In some examples, the lateral braces 108 are secured to vertical posts 114 of the subassemblies 104 and 106 via fasteners 116 such as screws, bolts, rivets, or other type of fasteners. The lateral braces 108 are also secured to crossmembers (described further herein with respect to FIGS. 2-4) of the subassemblies 104 and 106 via fasteners 116. The crossmembers may also be secured to the vertical posts 114 via fasteners 116, thereby providing additional strength and/or stability to the housing 100.

As shown in FIG. 1, the lateral braces 108 may be formed by L-shaped braces that extend across an entire width of the housing 100. For example, the lateral braces 108 may each include a portion extending in a substantially horizontal direction (referred to as "a horizontal portion") and a portion extending in a substantially vertical direction (referred to as "a vertical portion"). In some examples, the horizontal portion of the lateral braces 108 may be secured to ends of the crossmembers via fasteners 116. As shown in FIG. 1, the lateral braces 108 may be secured to the crossmembers at multiple locations. Furthermore, vertical portions of the lateral braces 108 may be secured to the vertical posts 114. For example, and as shown in FIG. 1, the vertical portions of the lateral braces 108 may be secured to the vertical posts 114 proximate an end of the vertical posts 114 and/or secured to the vertical posts along a length of an external portion of the vertical posts 114.

While describing the lateral braces 108 as being secured to and connecting the first subassembly 104 and the second subassembly 106, it is to be understood, that the lateral braces 108 may be secured to and used to connect one or more additional subassemblies to the first subassembly 104 and the second subassembly 106 such that the housing 100 may include more than two subassemblies (e.g., three, four, etc., subassemblies connected by lateral braces 108).

As shown in FIG. 1, the subassemblies 104 and 106 include a pair of vertical posts 114 at each end of the subassemblies 104 and 106. The vertical posts 114 may be metal hollow structural sections. However, other materials and/or shapes of vertical posts may be used. In some examples, individual pairs of vertical posts 114 are spaced apart from one another in order to provide additional strength and stability to the subassemblies 104 and 106. For example, the pair of the vertical posts 114 may provide strength and stability as the battery racks 102 are subjected to various movement during transport. The vertical posts 114 may also include apertures (element 212 in FIG. 2) that allow the subassemblies 104 and 106 and/or the entire housing 100 to be lifted by a crane or other lifting mechanism.

Figure 2:
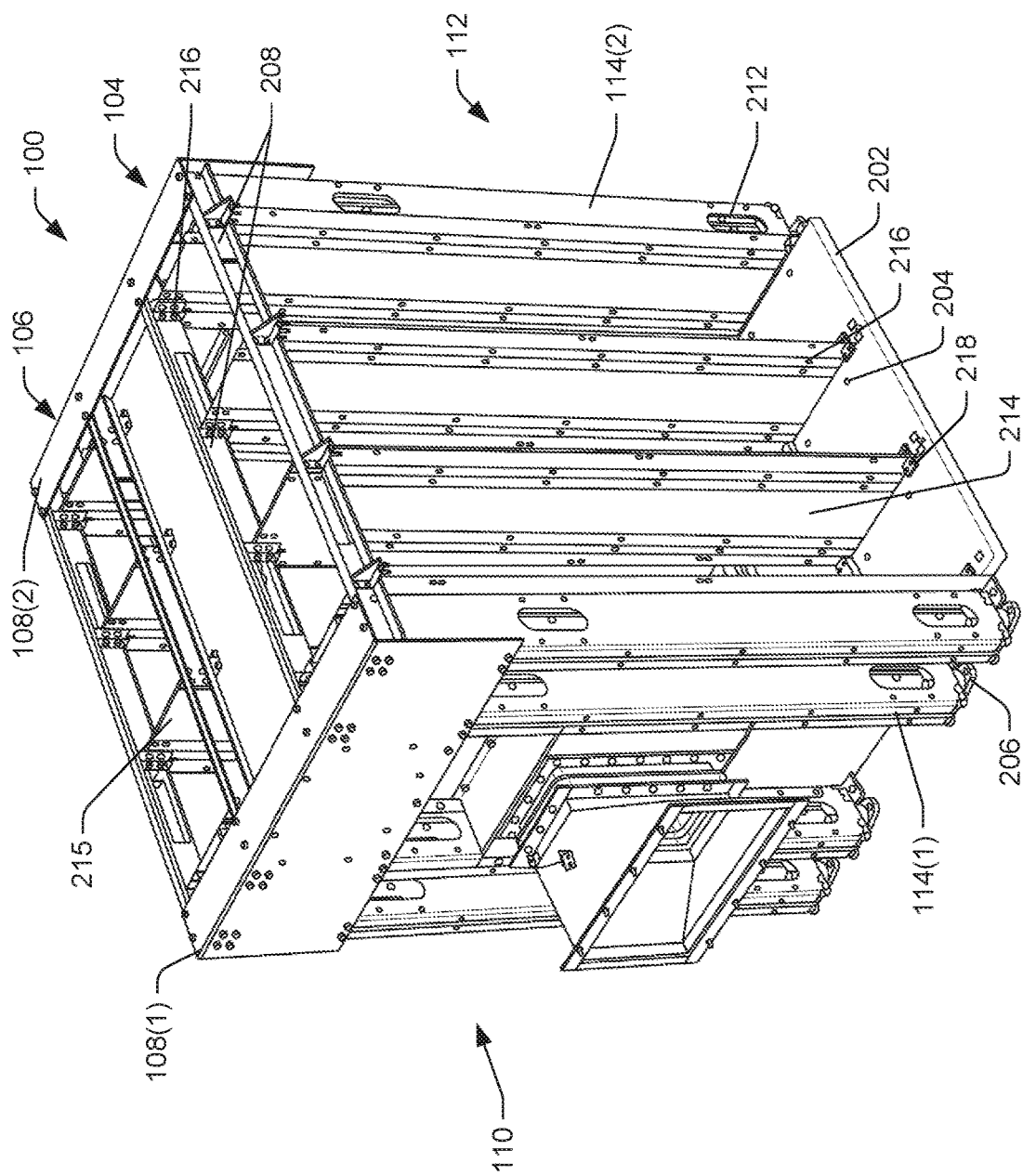
FIG. 2 is another perspective view of the example transportable structure illustrated in FIG. 1, in accordance with an example of the present disclosure.

The vertical posts 114 may further be secured to a lower structure (element 202 in FIG. 2) of the subassemblies 104 and 106, which is described in further detail with respect to FIG. 2. The lower structure is located proximate a bottom portion of the housing 100 and is configured to support at least a portion of a weight of the battery racks 102 and the batteries secured therein. The vertical posts 114 may be attached to the lower structure via fasteners 116. The lower structure may be attached to a secondary structure (not shown) such as a trailer, intermodal container, or other structure. In some examples, the lower structure is secured to the secondary structure via isolation mounts (elements 206 in FIG. 2) that are attached to a portion of the lower structure. The isolation mounts enable the housing 100 to be mounted to the secondary structure while allowing the housing 100 to be at least partially isolated from movement of the secondary structure.

The housing 100 further includes intermediate panels (element 214 of FIG. 2) in subassemblies 104 and 106. The intermediate panels are spaced apart at a distance to accommodate a width of a single battery rack of the battery racks 102. In other words, the intermediate panels are spaced apart such that battery racks 102 are insertable therebetween. In some examples, the intermediate panels include aperture therein through which fasteners may be inserted to secure the battery racks 102 to the intermediate panels. Furthermore, the battery racks 102 may be secured to the intermediate panels at multiple locations such that the intermediate panels offload at least a portion of a weight of the battery racks from the lower structure.

The housing 100 also includes various structures configured to facilitate cooling the batteries stored therein. For example, the housing 100 includes panels that are interposed between the subassemblies 104 and 106 on the first end 110 and the second end 112 of the housing 100. While not seen in FIG. 1, the panels may include one or more apertures. The panels may include a first panel 118 that is interposed between the subassemblies 104 and 106 proximate the first end 110 of the housing 100. As shown in FIG. 1, a length of the first panel 118 extends in a substantially vertical direction such that the length of the first panel 118 extends from a top portion of the housing 100 to a bottom portion of the housing 100. Meanwhile, a width of the first panel 118 spans a distance between the first subassembly 104 and the second subassembly 106. The first panel 118 may be secured to the first lateral brace 108(1) proximate a top portion of the first panel 118 and may be secured to the subassemblies 104 and 106 at one or more locations along a length of the first panel 118. For example, the first panel 118 may include one or more flanges 119 located around a perimeter of the first panel 118. The flanges 119 may include apertures through which fasteners 116 may pass in order to secure the first panel 118 to the first lateral brace 108(1) and the subassemblies 104 and 106. Additionally, and/or alternatively, the first panel 118 may be secured to the first lateral brace 108(1) and the subassemblies 104 and 106 via fasteners 116 and one or more brackets.

The first panel 118 shown in FIG. 1 includes a duct bellows 120 (or other type of air duct) that is attached to the first panel 118 such that the duct bellows 120 entirely covers (and circumscribes) the aperture in the first panel 118. The duct bellows 120 may also be connected to an air flow system 122, thereby fluidly connecting the housing 100 to the air flow system 122. In examples of the present disclosure, the air flow system 122 may draw air through the housing 100 at least partially via the duct bellows 120. In some examples, the housing 100 may be placed in an intermodal container, a trailer, on a flatbed trailer, or other secondary structure. In an example where the secondary structure is at least partially enclosed, the air flow system 122 may also provide conditioned air to the housing 100. Additionally, and/or alternatively, the air flow system 122 may draw ambient air through the housing 100 via one or more fans 124 and additional ducting.

The housing 100 may further include a top panel 126 interposed between the first subassembly 104 and the second subassembly 106 proximate a top portion 125 of the housing 100. For example, the top panel 126 may include a length that extends from a first end 110 of the housing 100 to the second end 112 of the housing 100. Meanwhile, a width of the top panel 126 spans a distance between the first subassembly 104 and the second subassembly 106. The top panel 126 may be secured to the subassemblies 104 and 106 proximate a top portion 125 of the subassemblies 104 and 106. For example, the top panel 126 may include one or more flanges located around a perimeter of the top panel 126. The flanges may include apertures through which fasteners 116 may pass in order to secure the top panel 126 to the subassemblies 104 and 106. Additionally, and/or alternatively, the top panel 126 may be secured to the subassemblies 104 and 106 via fasteners 116 and one or more brackets.

In some examples, the top panel 126, the first panel 118, and a second panel (shown in FIG. 3) create a return air plenum (shown in FIG. 3) located between the subassemblies 104 and 106. The return air plenum may be a space defined by the panels (i.e., the top panel 126, the first panel 118, and the second panel) and the battery racks 102 in the subassemblies 104 and 106. The spaced forming the return air plenum facilitates air circulation by providing a pathway through which air may flow. For example, air (either conditioned air or ambient air) may pass through the battery racks 102 via apertures in the front panels 128 of the battery racks 102. As the air passes over the battery modules 103 in the battery racks 102, heat is transferred (e.g., via convection) from the battery modules to the air. The air is collected between the subassemblies 104 and 106 in the return air plenum. The air flow system 122 may draw the hot air from the return air plenum through the duct bellows 120 and into the air flow system 122.

In some examples, the battery racks 102 may be electronically and/or communicatively coupled to one another via wiring. Additionally, and/or alternatively, the battery racks 102 may be electronically and/or communicatively coupled to a bank manager 130 that is configured to control function(s) of the battery racks 102. In some examples, the bank manager 130 may be separate from the BMS 107 described previously or the bank manager 130 may be incorporated in the BMS 107. The bank manager 130 may be communicatively and/or electronically coupled to a secondary power and energy source such as a generator set via a power conversion system (PCS) 132. The bank manager 130 includes electronic control circuits that monitor and/or regulate charging and discharge of batteries in the battery racks. The bank manager 130 monitors various parameters of the batteries and/or battery racks 102 including, but not limited to, battery type, temperature, capacity, state of charge, voltages, power consumption, remaining operational time, charging cycles, etc. The PCS 132 may control the voltage of the battery racks 102 to either pull or push power and energy from the battery racks 102. In some examples, the bank manager 130 may be mounted on of the lateral braces 108.

FIG. 2 is a perspective view of the housing 100 having the battery racks 102 removed therefrom. As described previously, the housing 100 includes the first subassembly 104 connected to the second subassembly 106 via the lateral braces 108. Furthermore, the subassemblies 104 and 106 may be substantially similar and may, therefore, include the same components. While the features of the housing 100 shown in FIG. 2 may be shown and/or described with respect to the first subassembly 104, it is to be understood that the second subassembly includes the same features, unless stated otherwise.

As shown in FIG. 2, the subassemblies 104 and 106 include a lower structure 202. The lower structure 202 may be located proximate a bottom portion of the housing 100 and may be attached to a secondary structure (not shown; e.g., a trailer, intermodal container, or other structure). In some examples, the lower structure 202 is configured to support at least a portion of a weight of the battery racks 102 (FIG. 1) thereon. Furthermore, the battery racks 102 may be attached to the lower structure 202 via fasteners that are inserted through apertures 204 in the lower structure 202. The lower structure 202 includes one or more components that provide structural support and stability for the battery racks 102. The lower structure 202 also secures the housing 100 to a secondary structure. The specific components of the lower structure 202 are described further herein.

In some examples, the lower structure 202 is attached to the secondary structure via isolation mounts 206 that are attached to the lower structure 202. The isolation mounts 206 enable the housing 100 to be mounted to a secondary structure while allowing the housing 100 to be at least partially isolated from movement of the secondary structure. As such, as the secondary structure (e.g., trailer, intermodal container, or other structure) moves and experiences vibration and or jostling, the forces generated by the vibrations and jostling may not be imparted to the housing 100 and/or such forces may be reduced if the forces are imparted on the housing 100. For example, the isolation mounts 206 may include various types of laminated pads, molded rubber isolation mounts, coil spring isolation mounts, cable isolation mounts, or the like. Example components of the isolation mounts are described further herein with respect to FIG. 5.

The housing 100 further includes crossmembers 208 located proximate the top portion of the housing 100. The crossmembers 208 may include a pair of crossmembers and may be spaced apart from the lower structure 202 by a vertical distance. In some examples, the vertical distance corresponds (e.g., between 60 inches and 140 inches) with a height of the battery racks 102. Furthermore, the pair of crossmembers 208 may be parallel and spaced apart from one another by a lateral distance. In some examples, the crossmembers 208 are connected to the lower structure 202 via the vertical posts 114 that are attached to the lower structure 202 and the crossmembers 208 via the fasteners 116. In some examples, an individual crossmember 208 is secured to an individual vertical post 114, and the crossmember 208 extends in a direction that is perpendicular to the vertical post 114. Furthermore, the crossmembers 208 may be formed by metal channel beams. In such an example, an outside web surface of the crossmembers 208 abuts the vertical posts 114 when the crossmembers 208 are secured to the vertical posts 114. However, other materials and/or shapes of crossmembers may be used. The crossmembers 208 provide structural support and/or stability to the housing 100 when the housing 100 experiences forces along a length (i.e., in a direction extending from the first end 110 to the second end 112) of the housing 100. Additionally, and/or alternatively, the crossmembers 208 may provide additional support and/or stability that is not described herein such as torsional support, support in a lateral direction, etc.

As shown in FIG. 2, the housing 100 includes a first pair 114(1) of vertical posts 114 attached to the lower structure 202 and the crossmembers 208 proximate the first end 110 of the housing 100. The housing 100 also includes a second pair 210(2) of vertical posts 210 attached to the lower structure 202 and the crossmembers 208 proximate the second end 112 of the housing 100. As such, each subassembly 104 and 106 may include four vertical posts located proximate four corners of the subassemblies 104 and 106. In some examples, the lower structure 202 extends in a direction along a length of the housing 100 (i.e., a direction extending from the first end 110 to the second end 112) and the crossmembers 208 extend in a direction that is substantially parallel to the direction of extension of the lower structure 202. Furthermore, the first pair 114(1) of vertical posts 114 may be spaced apart from one another at a distance that substantially corresponds with a distance between the crossmembers 208. Likewise, the second pair 114(2) of vertical posts 114 may also be spaced apart from one another at a distance that substantially corresponds with a distance between the crossmembers 208

Furthermore, as mentioned previously, the vertical posts 114 may include one or more apertures 212 therethrough. The apertures 212 in the vertical posts 210 may provide one or more lift points by which the housing 100 may be hoisted by a crane or other lifting mechanism. The apertures 212 may further provide access to the isolation mounts 206 such that a user may access the isolation mounts 206 and may attach and/or adjust the isolation mounts 206 to the secondary structure.

The housing 100 further includes intermediate panels 214. The intermediate panel 214 may be spaced apart at a distance to accommodate a width of the battery racks 102. That is to say, the intermediate panels 214 are spaced apart such that the battery racks 102 are insertable therebetween. In some examples, the intermediate panels 214 are formed from sheet metal having a thickness between 0.05 inches and 0.75 inches. Furthermore, the intermediate panels 214 may include one or more apertures 216 therein. In some examples, the battery racks 102 may be attached to the intermediate panels 214 via fasteners 116 that are inserted through the apertures 216. By attaching the battery racks 102 to the intermediate panels 214, at least a portion of the weight of the battery racks 102 is born by the intermediate panels 214, thereby offloading at least a portion of the weight from the lower structure 202. Such a configuration improves stability of the housing 100 as multiple components bear at least a portion of the weight of the battery racks 102. Furthermore, a height (i.e., distance between the lower structure 202 and the crossmembers 208) and spacing (i.e., distance between adjacent intermediate panels 214) of the intermediate panels 214 may be configured to be a tight fit the height and spacing correspond with dimensions of the battery racks 102 with some spacing for clearance such that the battery racks 102 are secured by the tight fit of the intermediate panels 214.

Additionally, and/or alternatively, the intermediate panels 214 may not bear the weight of the battery racks 102 when the battery racks 102 are stationary (or not accelerating) but may provide additional support to the lower structure 202 if/when the lower structure 202 flexes under the weight of the battery racks and/or if the battery racks 102 are subject to acceleration due to vibration or jostling caused by uneven roads, braking/accelerating events, turning, shipping via waterways, etc. Furthermore, the lower structures 202, crossmembers 208, lateral braces 108, and vertical posts 210 strengthen the housing 100 to endure forces imparted on the housing 100 in any direction.

In some examples, the intermediate panels 214 are attached to the lower structure 202 and the crossmembers 208 such that the intermediate panels 214 span the distance (which corresponds with a height of the battery racks) between the lower structure 202 and the crossmembers 208. The intermediate panels 214 may be attached to the lower structure 202 and the crossmembers 208 via brackets 218 and the fasteners 116. For example, a top end 215 of the intermediate panels 214 includes a cut out such that the top end 215 of the intermediate panels 214 extends between the crossmembers 208 and the cut out abuts a surface of the crossmember 208. The brackets 218 and fasteners 116 may secure the intermediate panel 214 to the crossmembers 208 proximate the cut out and/or the top end 215 of the intermediate panels 214 that is located between the crossmembers 208. Furthermore, the intermediate panels 214 include a tab (shown in FIG. 3) that is insertable through a slit in the lower structure 202. The intermediate panels 214 may be fastened to the lower structure 202 via the brackets 218 and fasteners 116 proximate the tabs and lower structure 202. Additionally, and/or alternatively, the subassemblies 104 and 106 include brackets 218 and fasteners 116 that secure a bottom portion of the intermediate panel 214 to the lower structure 202 proximate on a top surface of the lower structure 202.

Figure 3:
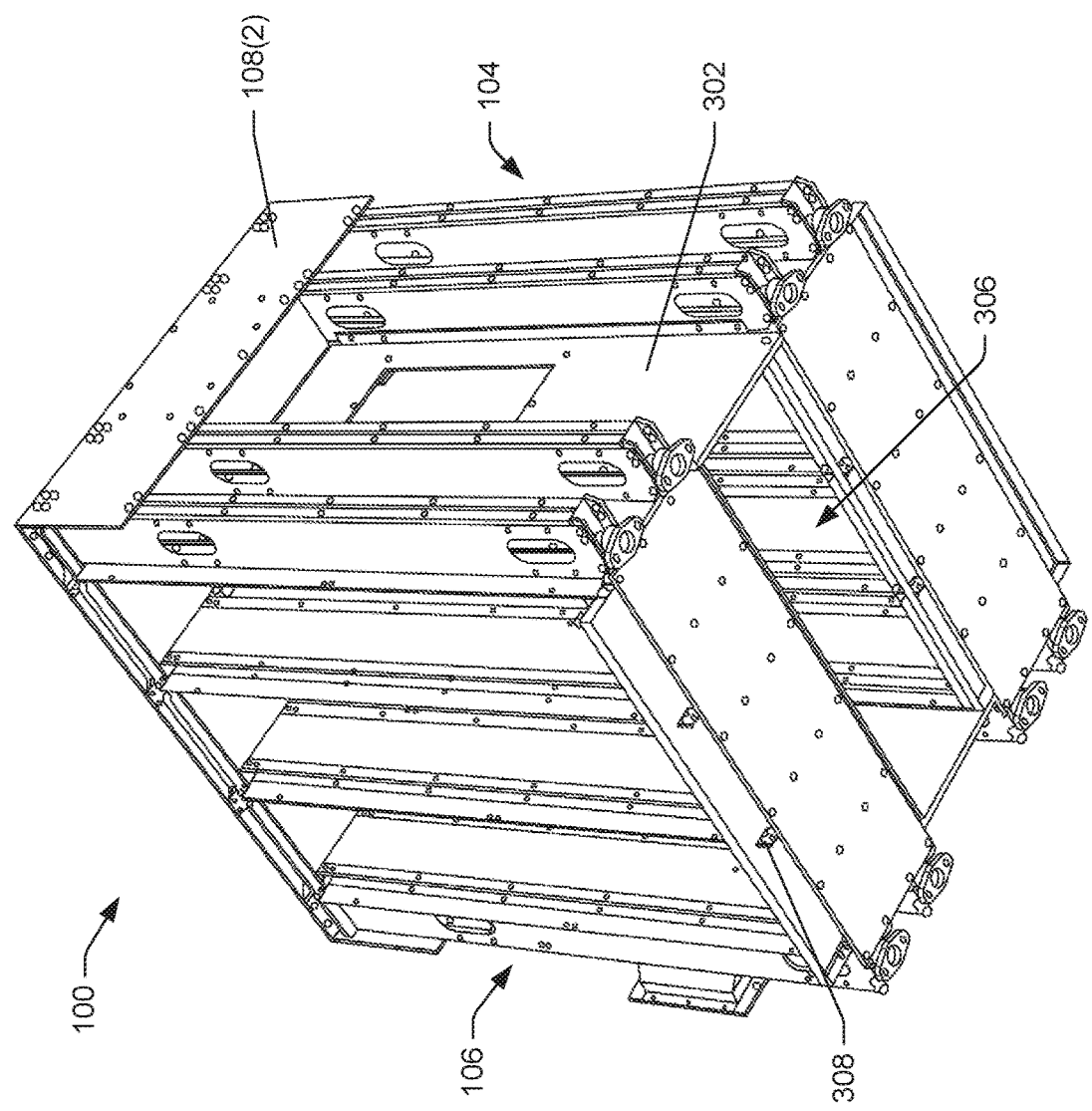
FIG. 3 is a further perspective view of the example transportable structure illustrated in FIG. 1, in accordance with an example of the present disclosure.

FIG. 3 is another perspective view of the housing 100 having the battery racks 102 removed therefrom. As described previously, the housing 100 includes panels (e.g., first panel 118 and top panel 126) that are interposed between the subassemblies 104 and 106 on the first end 110 and proximate a top portion 125 of the housing 100. As shown in FIG. 3, the housing 100 further includes a second panel 302 interposed between the subassemblies 104 and 106 and proximate the second end 112 of the housing. As shown in FIG. 3, a length of the second panel 302 extends in a substantially vertical direction such that the length of the second panel 302 extends from a top portion of the housing 100 to a bottom portion of the housing 100. Meanwhile, a width of the second panel 302 spans a distance between the first subassembly 104 and the second subassembly 106. The second panel may be secured to the second lateral brace 108(2) proximate a top portion of the second panel 302 and may be secured to the subassemblies 104 and 106 at once or more locations along a length of the first panel 302. For example, the second panel 302 may include one or more flanges located around a perimeter of the second panel 302. The flanges may include apertures through which fasteners 116 may pass in order to secure the second panel 302 to the second lateral brace 108(2) and the subassemblies 104 and 106. Additionally, and/or alternatively, the second panel 302 may be secured to the second lateral brace 108(2) and the subassemblies 104 and 106 via fasteners 116 and one or more brackets.

The second panel 302 may further include an aperture 304 located therein. The aperture 304 allows for additional airflow to flow through the aperture 304 when the air flow system 122 pulls air through the duct bellows 120. Additionally, when the air flow system 122 is not operating (or omitted) the aperture 304 allows ambient air to flow freely through the return air plenum 306 (that was described previously) and the duct bellows 120. The return air plenum 306 is located between the subassemblies 104 and 106 and collects hot air that passes over the battery modules in the battery racks 102 and collects between the subassemblies 104 and 106 in the return air plenum 306. Furthermore, when the air flow system 122 is operating, the air flow system 122 may draw the hot air from the return air plenum 306 through the duct bellows 120.

As described previously, the intermediate panels 214 include a tab 308 that is insertable through a slit in the lower structure 202. The tab 308 may prevent the intermediate panels 214 from shifting when the intermediate panels 214 are subjected to various forces from the battery racks 102 due to movement during transportation. The intermediate panels 214 may be fastened to the lower structure 202 via the brackets 218 and fasteners 116 proximate the tab 308 and lower structure 202.

Figure 4:
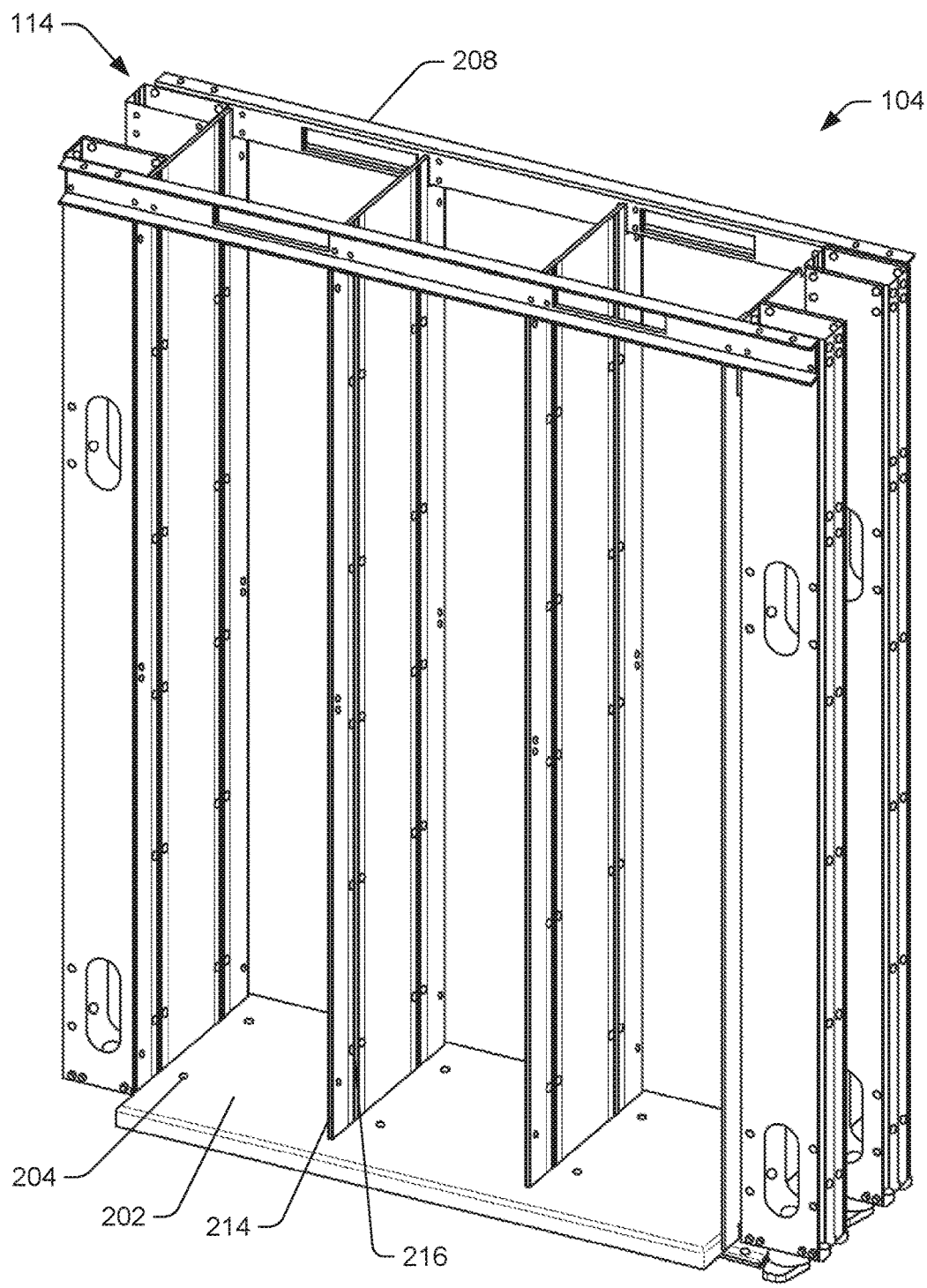
FIG. 4 is a perspective view of an example subassembly associated with the transportable structure illustrated in FIG. 1, in accordance with an example of the present disclosure.

FIG. 4 is a perspective side view of a single subassembly 104 of the subassemblies 104 and 106. As described previously, the subassemblies 104 and 106 may be substantially similar such that the subassemblies 104 and 106 include the same components. The subassembly 104 shows the lower structure 202 having apertures 204 therein by which the battery racks 102 may be attached to the lower structure 202 via fasteners 116 that are inserted through the apertures 204 in the lower structure 202. The lower structure 202 may be located proximate a bottom portion of the housing 100 and may be attached to a secondary structure (e.g., a trailer, intermodal container, or other structure). In some examples, the lower structure 202 is configured to support at least a portion of a weight of the battery racks 102 thereon. However, as mentioned previously, the battery racks 102 are also attached to the intermediate panels 214 such that the intermediate panels 214 bear at least a portion of the weight of the batter racks 102 and/or provide additional support when the lower structure flexes 202 under the weight of the battery racks 102 and/or the batter racks 102 experience acceleration due to various transportation conditions.

Figure 5:
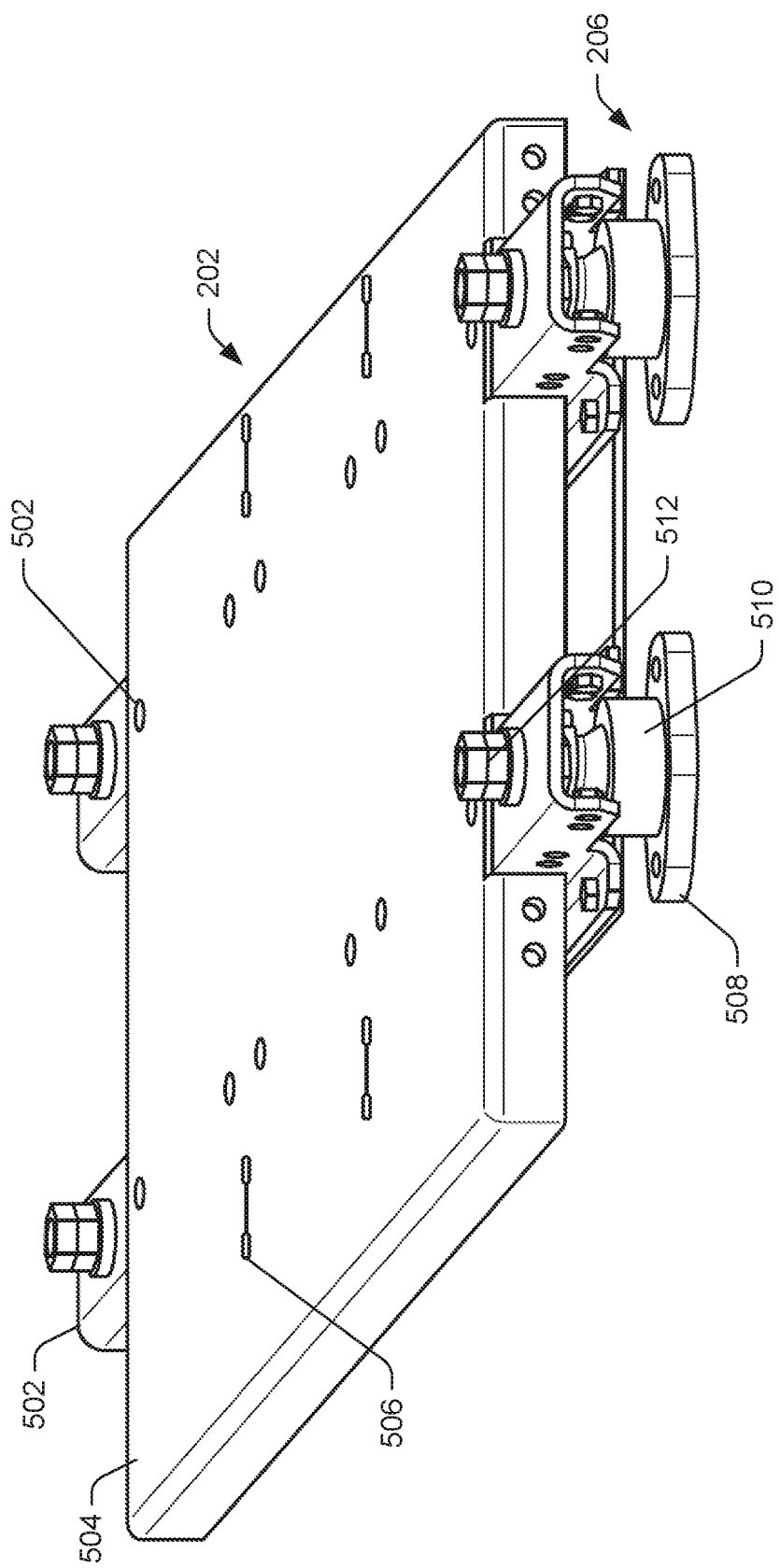
FIG. 5 is a top perspective view of an example lower structure associated with the transportable structure illustrated in FIG. 1, in accordance with an example of the present disclosure.

FIG. 5 is a top perspective view of the lower structure 202 as shown and described in FIGS. 1-4. As shown in FIG. 5, the lower structure 202 includes lower frame rails 502. In some examples, the lower structure 202 includes a pair of lower frame rails 502 that are parallel to one another. Furthermore, the frame rails 502 may be spaced apart by a distance that corresponds with a distance between pairs of vertical posts 114. In some examples, the vertical posts 114 may be secured to the lower structure 202 via the frame rails 502. In other words, the vertical posts 114 may be secured to the frame rails 502 via brackets and fasteners. The lower structure 202 further includes a mounting sheet 504 that is attached to a top surface of the pair of lower frame rails 502. The mounting sheet 504 defines a top surface of the lower structure 202 and is configured to support at least a portion of weight of the batter racks 102. The mounting sheet 504 may be formed from sheet metal and includes apertures 204 therein, through which fasteners 116 may be inserted to attach the battery racks 102 to the lower structure 202. The mounting sheet 504 further includes slits 506 through which the tabs 308 of the intermediate panels 214 are insertable to secure the intermediate panels 214 to the lower structure 202.

Furthermore, the lower structure 202 includes isolation mounts 206 attached to each end of the lower frame rails 502. The isolation mounts 206 may include a base plate 508 that is attachable to the secondary structure via the fasteners 116. The isolation mounts 206 further include a flexible element 510 that connects that base plate 508 to an equipment stud 512 elastically. That is to say the flexible element 510 of the isolation mount is configured to eliminate and/or reduce forces that may be imparted on the housing 100 by the secondary structure due to vibration, jostling, or other forces associated with transportation of the housing 100 and/or the secondary structure.

Figure 6:
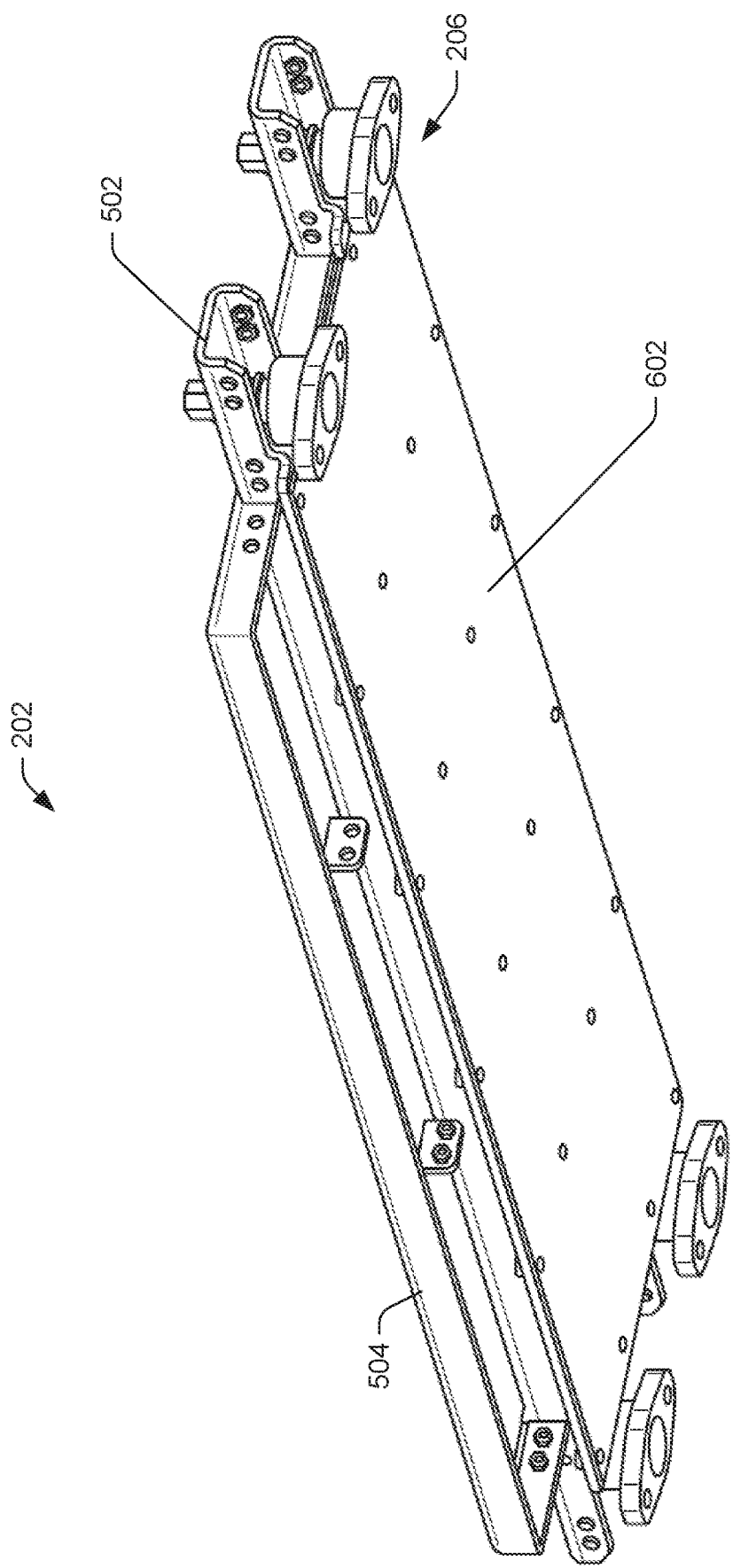
FIG. 6 is a bottom perspective view of an example lower structure associated with the transportable structure illustrated in FIG. 1, in accordance with an example of the present disclosure.

FIG. 6 is a bottom perspective view of the lower structure 202 as shown and described in FIGS. 1-5. As shown in FIG. 6, the lower structure 202 includes a reinforcing sheet 602 attached to a bottom surface of the pair of lower frame rails 502. The reinforcing sheet 602 defines a bottom surface of the lower structure 202 and is configured to reinforce strength and stability of the lower structure 202 in vertical, lateral, rotational, and twisting directions. Furthermore, the reinforcing sheet 602 may be attached to the isolation mounts 206 and/or a bottom side of the frame rails 502. In some examples, the reinforcing sheet 602 is secured to the frame rails 502 at multiple locations along a length of the frame rails 502 and the reinforcing sheet 602.

INDUSTRIAL APPLICABILITY

The present disclosure provides an improved transportable housing for storing battery racks having batteries secured therein. The housing may be used in a variety of applications. For example, the batteries may be used in oil and gas drilling applications to provide supplemental power and energy to generator sets during drilling operations. The housing provides a mounting structure to which battery racks may be secured in order to transport the battery racks. Furthermore, due to the air flow paths created by housing, temperature of the batteries in the battery racks can be regulated, thereby allowing the battery racks to remain secured in the housing during operation, which can result in decreased down time for preparing the battery racks for transportation and improve temperature management of the batteries, among other benefits.

According to some embodiments, a housing 100 includes first and second subassemblies 104 and 106 connected via lateral braces 108. The subassemblies 104 and 106 include intermediate panels 214 to which the battery racks 102 are secured within the housing 100. The housing 100 further includes one or more interconnected lower structures 202, crossmembers 208, lateral braces 108, and/or vertical posts 210 configured to strengthen the housing 100, and to substantially resist forces imparted on the housing 100 in any direction. As such, the housing 100 is able to endure vibration or jostling experienced when transporting the housing 100 over uneven roads, braking or accelerating, turning, shipping via waterways, etc. Furthermore, the particular configuration of the housing 100 improves airflow through the housing 100 which may reduce the battery overheating during operation and/or transportation. Additionally, due to the configuration of the housing 100 and the battery racks 102, the battery racks 102 can remain installed in the housing 100 while operating as the housing 100 provides adequate air circulation for the batteries.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A housing, comprising:
   a first subassembly including:
   a first lower structure defining a bottom portion of the first subassembly;
   a first pair of crossmembers defining a top portion of the first subassembly;
   a first pair of vertical posts attached to the first lower structure and the first pair of crossmembers at a first end of the first subassembly;
   a second pair of vertical posts attached to the first lower structure and the first pair of crossmembers at a second end of the first subassembly; and
   a first plurality of intermediate panels including at least three intermediate panels extending in a vertical direction between the first lower structure and the first pair of crossmembers, and located between the first pair of vertical posts and the second pair of vertical posts, wherein individual intermediate panels of the first plurality of intermediate panels are perpendicular to the first pair of crossmembers and spaced apart at a first distance to define at least two spaces for receiving vertically-arranged battery racks; and
   a second subassembly including:
   a second lower structure defining a bottom portion of the second subassembly;
   a second pair of crossmembers defining a top portion of the second subassembly;
   a third pair of vertical posts attached to the second lower structure and the second pair of crossmembers at a first end of the second subassembly;
   a fourth pair of vertical posts attached to the second lower structure and the second pair of crossmembers at a second end of the second subassembly; and
   a second plurality of intermediate panels including at least three intermediate panels extending in a vertical direction from the second lower structure to the second pair of crossmembers, and located between the third pair of vertical posts and the fourth pair of vertical posts, wherein individual intermediate panels of the second plurality of intermediate panels are perpendicular to the second pair of crossmembers and spaced apart at a second distance to define at least two spaces for receiving vertically-arranged battery racks; and
   a pair of lateral braces securing the first subassembly to the second subassembly by coupling the first pair of vertical posts to the third pair of vertical posts, and the second pair of vertical posts to the fourth pair of vertical posts,
   each brace of the pair of lateral braces having:
   a vertical portion, and
   a horizontal portion secured to the first pair of crossmembers and the second pair of crossmembers.

2. The housing of claim 1, wherein the first lower structure extends in a first lateral direction, and the first pair of crossmembers extend in a direction that is substantially parallel to the first lower structure, and
   the second lower structure extends in a second lateral direction, and the second pair of crossmembers extends in a direction that is substantially parallel to the second lower structure, wherein the first lateral direction is substantially parallel to the second lateral direction.

3. The housing of claim 1, wherein the first plurality of intermediate panels are spaced apart at the first distance to accommodate a first battery rack therebetween, the first battery rack being disposed between the first plurality of intermediate panels, and attached to the first plurality of intermediate panels such that the first plurality of intermediate panels bear at least a portion of a weight of the first battery rack, and
   the second plurality of intermediate panels are spaced apart at the second distance to accommodate a second battery rack therebetween, the second battery rack being disposed between the second plurality of intermediate panels, and attached to the second plurality of intermediate panels such that the second plurality of intermediate panels bear at least a portion of a weight of the second battery rack.

4. The housing of claim 3, wherein the first battery rack is secured to an individual intermediate panel of the first plurality of intermediate panels at multiple locations.

5. The housing of claim 1, wherein the first lower structure further comprises:
   a pair of lower frame rails;
   a mounting panel attached to a top surface of the pair of lower frame rails;
   a reinforcing panel attached to a bottom surface of the pair of lower frame rails; and
   a plurality of isolations mounts, wherein an individual isolation mount of the plurality of isolation mounts is attached to each end of the pair of lower frame rails, wherein the plurality of isolation mounts are securable to a secondary structure, thereby securing the first lower structure to the secondary structure.

6. The housing of claim 5, wherein at least a portion of a battery rack is attached to the mounting panel, and the mounting panel supports at least a portion of a weight of the battery rack.

7. The housing of claim 1, further comprising:
a first panel coupled to the first subassembly and the second subassembly adjacent a first brace of the pair of lateral braces, the first panel extending from the first lower structure and the second lower structure to the first pair of crossmembers and the second pair of crossmembers; and
a second panel coupled to the first subassembly and the second subassembly adjacent a second brace of the pair of lateral braces, the second panel extending from the first lower structure and the second lower structure to the first pair of crossmembers and the second pair of crossmembers, wherein the first subassembly and the second subassembly are separated by a distance to form an air plenum between the first subassembly and the second subassembly.

8. The housing of claim 1, further comprising:
a first panel interposed between the first subassembly and the second subassembly on a first end of the housing, the first panel parallel with the vertical portion of a first brace of the pair of lateral braces and defining a first aperture;
a second panel interposed between the first subassembly and the second subassembly on a second end of the housing, the second panel parallel with the vertical portion of a second brace of the pair of lateral braces and defining a second aperture; and
a duct bellows attached to the first panel such that the duct bellows circumscribes the first aperture, wherein the duct bellows is configured to fluidly connect the housing to an air flow system that draws air through the housing at least partially via the duct bellows.

9. A housing, comprising:
a plurality of subassemblies, at least one subassembly of the plurality of subassemblies including:
a lower structure extending in a first direction and configured to support one or more batteries;
an upper structure extending in the first direction and spaced apart from the lower structure by a vertical distance;
a plurality of vertical posts attached to the lower structure, the plurality of vertical posts connecting the lower structure with the upper structure; and
a plurality of intermediate panels including at least three intermediate panels located between the plurality of vertical posts, the plurality of intermediate panels extending in a vertical direction between the lower structure and the upper structure, wherein a battery of the one or more batteries is attached to the lower structure and at least two intermediate panels of the plurality of intermediate panels and the plurality of intermediate panels defines at least two spaces for receiving the one or more batteries; and
a lateral brace attached to and connecting the plurality of subassemblies by coupling the upper structure of adjacent subassemblies, wherein the lateral brace includes:
a vertical portion coupled to at least one of the plurality of vertical posts, and
a horizontal portion coupled to the upper structure.

10. The housing of claim 9, wherein the lower structure includes:
a pair of frame rails spaced apart from one another and extending in the first direction such the pair of frame rails are substantially parallel;
a mounting sheet attached to a top portion of the pair of frame rails; and
a reinforcing sheet attached to a bottom portion of the pair of frame rails.

11. The housing of claim 10, wherein the mounting sheet includes one or more apertures through which one or more fasteners are inserted to secure the one or more batteries to the lower structure.

12. The housing of claim 10, wherein the lower structure further includes isolation mounts attached to ends of the pair of frame rails.

13. The housing of claim 9, wherein an individual intermediate panel of the plurality of intermediate panels includes apertures along a length of the individual intermediate panel through which one or more fasteners may be inserted to secure the one or more batteries to the individual intermediate panel.

14. The housing of claim 9, wherein the one or more batteries are secured to the plurality of intermediate panels such that the plurality of intermediate panels supports at least a portion of the one or more batteries.

15. The housing of claim 9, wherein the plurality of subassemblies are spaced apart to form an air plenum between adjacent subassemblies of the plurality of subassemblies, the air plenum defined at least in part by:
a first panel at a first end of the adjacent subassemblies adjacent the lateral brace;
a first subassembly of the adjacent subassemblies;
a second subassembly of the adjacent subassemblies; and
further comprising an air duct connected to the first and configured to fluidly connect the housing to an air flow system that draws air through the one or more batteries and the housing at least partially via the air duct.

* * * * *